O. R. HADLEY.
ENVELOP CLOSURE.
APPLICATION FILED MAR. 12, 1917.

1,272,428.

Patented July 16, 1918.

Witnesses
W. Moore
E. L. Mueller

Inventor
O. R. Hadley
By Chandler & Chandler
Attorneys

UNITED STATES PATENT OFFICE.

OLIVER R. HADLEY, OF BRADFORD, NEW HAMPSHIRE.

ENVELOP-CLOSURE.

1,272,428.

Specification of Letters Patent. Patented July 16, 1918.

Application filed March 12, 1917. Serial No. 154,232.

*To all whom it may concern:*

Be it known that I, OLIVER R. HADLEY, a citizen of the United States, residing at Bradford, in the county of Merrimack, State of New Hampshire, have invented certain new and useful Improvements in Envelop-Closures; and I do hereby declare the following to be a full, clear, and exact description of the invention, such as will enable others skilled in the art to which it appertains to make and use the same.

This invention is an improvement in paper receptacles and has particular reference to an envelop closure.

An object of the invention is to provide an improved closure which will effectively prevent an envelop from becoming accidentally opened by contact with other mail or otherwise, and, to this end, use is made of a pair of eccentrically mounted disks adjustable relative to each other to engage the closure flap of an envelop and retain the same in closing position.

Another object is the provision of an improved closure of this character which is simple in construction, easy to manufacture and effective in carrying out the purpose for which it is designed.

The inventive idea involved is capable of receiving a variety of mechanical expressions, one of which, for the purpose of illustrating the present invention, is shown in the accompanying drawing, wherein:—

Figure 1:
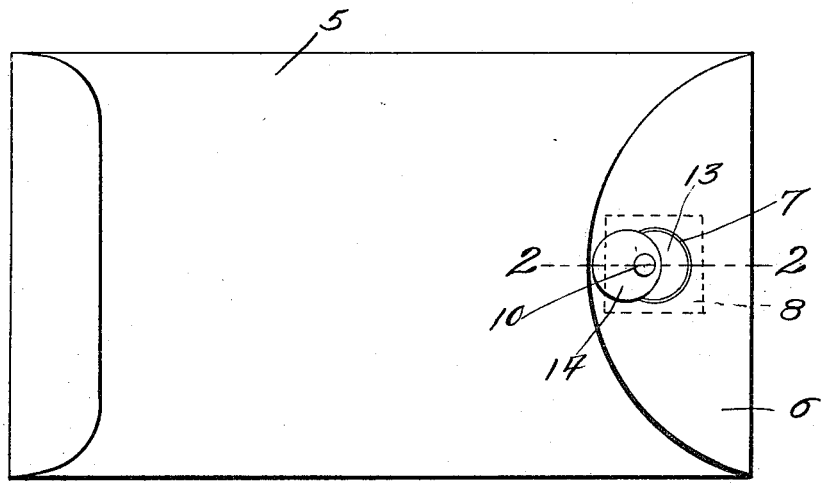
Figure 1 is a plan view of an envelop showing the closure device in closing position.
Figure 2:
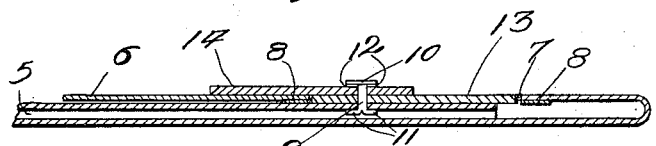
Fig. 2 is an enlarged section on the line 2—2 of Fig. 1.
Figure 3:
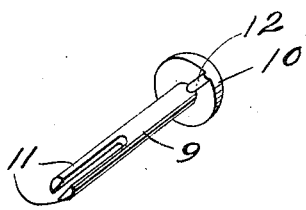
Fig. 3 is a perspective view of the rivet upon which the closure members or locking disks are mounted.

The drawing illustrates what is now believed to be a preferred form of the invention which is used in connection with envelops for containing circulars, catalogues and like articles, but it will of course be understood that the same may also be employed with envelops of other characters.

The envelop 5 is provided with the usual closure flap 6 which has an opening 7 therein, preferably of circular formation and surrounded by a reinforcement 8.

Adjacent the opening of the envelop the same has secured thereto a rivet 9 consisting of a head 10 and prongs 11 which are adapted to be projected through the body of the envelop and bent over so as to secure said rivet in position. The inner side of the head is preferably provided with the ribs 12 extending diametrically on each side of the shank of the rivet for a purpose which will presently appear.

A relatively stationary disk or locking member 13 is eccentrically mounted upon the shank of the rivet and has associated therewith a rotatable disk or locking member 14 which is likewise eccentrically mounted upon the rivet and interposed between the head thereof and said disk 13.

When it is desired to close the envelop the disk 14 is rotated until the periphery thereof registers or is flush with the disk 13. The closure flap 6 is then folded over, and the opening 7, which is of a slightly larger diameter than the disks 13 and 14 will receive said disks therein. Then by rotating the disk 14, the same will be caused to assume a position as shown in Fig. 1 whereupon the closure flap will be locked in position and in order to prevent the same from accidentally coming open the ribs 12 of the head of the rivet are caused to frictionally engage the adjacent surface of the disk 14 so that the same will be prevented from freely turning on its pivot.

What is claimed is:—

1. The combination with an envelop having a closure flap provided with an opening, of a closure device for said flap including relatively adjustable and eccentrically mounted disks which extend through the opening in said closure flap when the same is in closing position, one of said disks being adjustable to overlap said closure flap and prevent opening thereof.

2. The combination with an envelop having a closure flap provided with an opening, a rivet carried by said envelop, a stationary disk eccentrically mounted upon said rivet, and an adjustable disk eccentrically mounted upon said rivet and movable to overlap said closure flap when the same is in closing position to prevent opening thereof, the opening in said closure flap receiving said disks when the flap is adjusted to closing position.

3. The combination with an envelop having a closure flap provided with an opening, a rivet carried by said envelop, a stationary disk eccentrically mounted upon said rivet, an adjustable disk eccentrically mounted upon said rivet and movable to overlap said closure flap when the same is in closing position to prevent opening thereof, the opening in said closure flap receiving said disks when the flap is adjusted to closing position, and ribs formed upon the head of said rivet and frictionally engaging said adjustable disk to resist adjustment thereof.

4. An envelop including a body having a closure flap therefor provided with an opening, a locking device for the flap including relatively adjustable disks one of which passes through the opening in the closure when the same is moved to closing position while the other engages in said opening when the locking device is in operative position, the first named disk being adjustable to overlap the closure flap and prevent opening thereof.

In testimony whereof, I affix my signature in the presence of two witnesses.

OLIVER R. HADLEY.

Witnesses:
A. F. MOOR,
A. I. MOORE.

Copies of this patent may be obtained for five cents each, by addressing the "Commissioner of Patents, Washington, D. C."